(12) United States Patent
Bish et al.

(10) Patent No.: US 6,598,339 B1
(45) Date of Patent: Jul. 29, 2003

(54) STRAWBERRY PLUG TRANSPLANT SYSTEM

(75) Inventors: Eric Bryan Bish, New Haile, NC (US); Daniel James Cantliffe, Gainesville, FL (US); Craig Kellman Chandler, Tampa, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 09/978,485

(22) Filed: Oct. 16, 2001

(Under 37 CFR 1.47)

Related U.S. Application Data

(63) Continuation of application No. 09/172,466, filed on Oct. 14, 1998, now abandoned.
(60) Provisional application No. 60/062,113, filed on Oct. 14, 1997.

(51) Int. Cl.[7] .................... A01G 31/06; A01G 25/02
(52) U.S. Cl. .......................... 47/59 R; 47/82
(58) Field of Search .................. 47/59 R, 59 S, 47/62 R, 62 A, 62 C, 62 E, 62 N, 67, DIG. 3, 58.1 R, 79, 82, 73

(56) References Cited

U.S. PATENT DOCUMENTS

| | | | |
|---|---|---|---|
| 3,365,840 A | | 1/1968 | Cooper |
| 3,667,157 A | * | 6/1972 | Longhini .................. 47/59 R |
| 4,250,666 A | | 2/1981 | Rakestraw |
| 4,392,328 A | | 7/1983 | Walker |
| 4,774,787 A | | 10/1988 | Schwartz |
| 4,825,592 A | | 5/1989 | Earls |
| 4,953,322 A | | 9/1990 | Edwards |
| 5,009,029 A | | 4/1991 | Wittlin |
| 5,042,196 A | | 8/1991 | Lukawski |
| 5,099,605 A | | 3/1992 | Moffet, Jr. |
| 5,201,141 A | | 4/1993 | Ahm |
| 5,216,836 A | | 6/1993 | Morris et al. |
| 5,421,515 A | | 6/1995 | Rinkewich |
| 5,599,443 A | * | 2/1997 | Yamasaki et al. ........... 210/151 |
| 5,615,519 A | | 4/1997 | Abe et al. |
| 5,628,811 A | | 5/1997 | College et al. |
| 5,787,824 A | * | 8/1998 | Kohno .......................... 111/14 |
| 5,826,375 A | | 10/1998 | Black |
| 6,016,628 A | | 1/2000 | Schlosser |
| 6,058,651 A | | 5/2000 | Perez |

FOREIGN PATENT DOCUMENTS

| | | | |
|---|---|---|---|
| EP | 301619 | 2/1989 | |
| FR | 2644669 | 9/1990 | |
| FR | 2680626 A1 | * 3/1993 | ............ A01G/9/02 |
| GB | 1584959 | 12/1981 | |
| GB | 2255498 | 11/1992 | |
| NL | 8900206 | 8/1990 | |

OTHER PUBLICATIONS

Boxus, P., C. Damiano, E. Brasseur, "Strawberry" In: Handbook of Plant Cell Culture, vol. 3, pp. 453–486, 1984, Macmillan Publishing Co., New York, NY.

(List continued on next page.)

*Primary Examiner*—Michael J. Carone
*Assistant Examiner*—Son T. Nguyen
(74) *Attorney, Agent, or Firm*—Saliwanchik, Lloyd & Saliwanchik

(57) ABSTRACT

The subject invention pertains to a system and method for growing strawberry plants for transplanting. The system of the invention includes elevated gutters containing soil-less rooting medium for growth of mother plants, wherein the gutters are separated from one another by no more than 30 centimeters at their centers, drip tubing, hanging trays to root daughter plants, and means for extending the photoperiod of the mother plants. The method of the subject invention includes growing strawberry plants for an extended photoperiod in the system.

3 Claims, 1 Drawing Sheet

OTHER PUBLICATIONS

Boxus, P., "Review of in vitro strawberry mass production", Acta Horticultural Inter. Strawberry Sump., vol. 265, pp. 309–320, 1989, Cesena, Italy.

Hennion, B., Schupp, J. Longuesserre, Fraisimotte: "A Strawberry Plug Plant Develpoed by CIREF in France", Proc. Third Int. Strawberry Symp., Acta Hort. vol. 439, No. 1, pp. 469–474, 1997.

Littell, R.C., R.J., Freund, P.C. Spector, SAS System for Linear Models, Third Edition, SAS Institute Inc., Cary, N.C., 1991, entire book.

Swartz, Harry J., Gene J. Galletta, Richard H. Zimmerman, "Field Performance and Phenotypic Stability of Tissue Culture–propagated Strawberries", J. Amer. Soc. Hort Sci., vol. 106, No. 5, pp. 667–673, 1981.

* cited by examiner

STRAWBERRY PLUG TRANSPLANT SYSTEM

CROSS-REFERENCED TO RELATED APPLICATION

This application is a continuation of application U.S. Ser. No. 09/172,466, filed Oct. 14, 1998, now abandoned; which claims priority to U.S. Ser. No. 60/062,113, filed Oct. 14, 1997.

BACKGROUND OF THE INVENTION

Strawberries are an important crop throughout the world. Due to genetic heterozygosity, adaptability, and plasticity of the plant, this species can grow in varied environments throughout the world, from Alaska to South Africa (Martinelli, A. [1992] "Micropropagation of strawberry (Fragaria spp.)" *Biotechnology in Agriculture and Forestry* 18:354–370, Springer Verlag, Berlin, W. Germany). The high value of the fruit allows for intensive production methods in many regions.

An estimated 1.8 billion strawberry plants are vegetatively propagated throughout the world each year (Boxus, P. [1989] "Review of in vitro strawberry mass production" Acta Horticulture. Inter. Strawberry Symp., Cesena, Italy 265:309–320). Greater than 700 million of these plants are propagated in the United States. Commercial strawberry cultivars must be propagated vegetatively because seeds are not true to type. Strawberry transplants are produced conventionally by planting a field nursery in early summer, the nursery plants produce daughter plants on stolons in response to long day lengths and high temperatures. In late summer and early fall the daughter plants from the nursery field are dug, soil is removed from the roots, and then the plants may be cold stored for several months before planting, or planted immediately. These plants may become extremely stressed during this process. Additionally, inconsistency in strawberry transplant production and handling, coupled with post transplant conditions can contribute to delayed flowering and subsequent fruiting irregularity, and disease and spider mite epidemics due to pathogen infestation and plant stress. The percentage of marketable fruit may therefore be reduced. Mechanical digging and shaking (to remove soil from roots) often damages roots and breaks petioles, reducing the number of ftmctional leaves for use by the transplant during establishment and creating possible sites for pathogen infection. Bare-root transplants often require large quantities of water at planting, especially in warm climates. This further exacerbates plant pest problems and can leach nutrients.

One of the greatest challenges facing the current strawberry plant propagation system may be the elimination, by the year 2001, of the fumigant methyl bromide (Courter, J. W. [1993] "Accord reached on production cuts from methyl bromide" N. Amer. Strawberry Growers Assoc. Newsletter 18:6). Methyl bromide has been used on the majority of commercial acreage for disease control and effective alternatives have not been developed. Additionally, there have been years when nurseries have had difficulty digging plants because of adverse weather conditions during the digging period. Varying weather conditions during the transplant production season can cause variability in transplant performance from year to year.

Through micropropagation, large quantities of uniform, vigorous, pathogen-free plants can be produced (Boxus, P., C. Damiano, and E. Brasseur [1984] "Strawberry" In: Handbook of Plant Cell Culture, Vol. 3, p. 453–486, Macmillan Publishing Co., New York, N.Y.). Micropropagated plants are more expensive than standard plants, but the increased runner production of micropropagated plants (Swartz, H. H., C. J. Galletta, and R. H. Zimmerman [1981] "Field Performance and Phenotypic Stability of Tissue Culture-propagated Strawberries" J. Am. Soc. Hortic. Sci. 106:667–673) has justified the increased expense for some nursery growers. Micropropagated plants often produce smaller fruit and therefore have not been directly used for fruit production. In some cultivars, bare-root daughter plants of micropropagated mother plants had increased fruit production compared to conventional bare-root plants which were not micropropagated. The daughter plants from micropropagation, however, are produced in field nurseries and therefore can develop the same inconsistencies as conventional plants due to temperature fluctuations and exposure to pathogens.

The above problems of transplant variability could be avoided by the use of micropropagation derived plug transplants which can be mechanically transplanted into the field similar to other vegetable transplants. Plug (tray) transplants have been used successfully in Europe since the late 1980's (Hennion, B., J. Schupp, and J. Longuesserre [1996] Fraisimotte: a strawberry-plug plant developed by CIREF. p. 87 Abstract; $3^{rd}$ Inter. Strawberry Symp., Veldhoven, The Netherlands) and have been the subject of research in North America. In North Carolina, plugs have been reported to have several distinct advantages over bare-root transplants: plugs required only 10% of the water needed for bare-root establishment in spring production systems; a mechanical multiple-row plug transplanter could be used for planting; minimal root damage during transplanting which provided for quick root establishment; and plant survival was greater (Poling, E. S. and K. Parker [1990] "Plug production of strawberry transplants" Adv. in Strawberry Prod. 9:37–39). 'Chandler' plug transplants grown in New Jersey had three times the fruit production of dormant crowns, but primary fruit size was lower with the plug transplant (Fiola, J. and R. Lengyen [1995] "Plug transplants are superior to dormant transplants for productivity in strawberry plasticulture" pg. 289–291, In: Proc. of the IV N. Amer. Strawberry Conf., University of Florida Horticultural Sciences Department, Gainesville, Fla.).

BRIEF SUMMARY OF THE INVENTION

The subject invention provides inexpensive materials and methods for growing strawberry plants. In a preferred embodiment the methods use tissue cultured mother plants in elevated troughs 12 to produce strawberry daughter plant tips. The daughter plant tips hang from the troughs 12 and continue to grow down towards the ground. The same mother plants can be used for extended periods and continue to produce large amounts of high quality daughter plant tips. The runners are harvested as long chains of daughter plant tips. When this system is used in a protective structure such as a greenhouse, the plants remain dry. This reduces pathogen dissemination and infection.

In a preferred embodiment, the subject invention further provides a system 14 for rooting the daughter plants 16. In a specific embodiment, this system 14 uses hanging trays 18. As the daughter plants grow they are placed in these hanging trays for immediate rooting. The trays 18 can either be watered from above by a mist or from below with a mist or capillary mat. In a specific embodiment, Rock wool or OASIS trays are used because they have preformed holes for placing daughter plants 16 and have high water holding capacity. There is no need for fertilizer for the daughter plant trays 18 because the daughter plants receive nutrients from the mother plant.

DETAILED DISCLOSURE OF THE INVENTION

The subject invention process yields high quality strawberry plant daughter plant tips inexpensively. The invention system has the following advantages over other current propagation techniques:

1. Reduced water and fertilizer usage—This invention system 14 delivers water and fertilizer directly to the plant root system. This system 14 can also use an inexpensive drip tube to deliver water and nutrients evenly and consistently to plants.
2. Reduced pesticide inputs—This invention system does not use fumigation; inorganic media can be used for plant support reducing soil borne pathogens; plants remain dry thereby greatly reducing fungal or bacterial infection. Also, because there are no weeds, no herbicides are needed.
3. Increased daughter plant production—Runners can continue to grow down towards the ground. Greater than 2500 plants/m$^2$ have been produced in 16 weeks.
4. Very high daughter plant survival—Approximately 99% survival as compared to 80% in conventional systems. The high survival rate is partially due to high quantity and quality of active root tips on the daughter plants 16.
5. Continued system use—The same mother plants 10 have remained productive in this system for over a year. If this system is used in a protective structure, such as a greenhouse, daughter plant production can continue year round.

Figure 1:
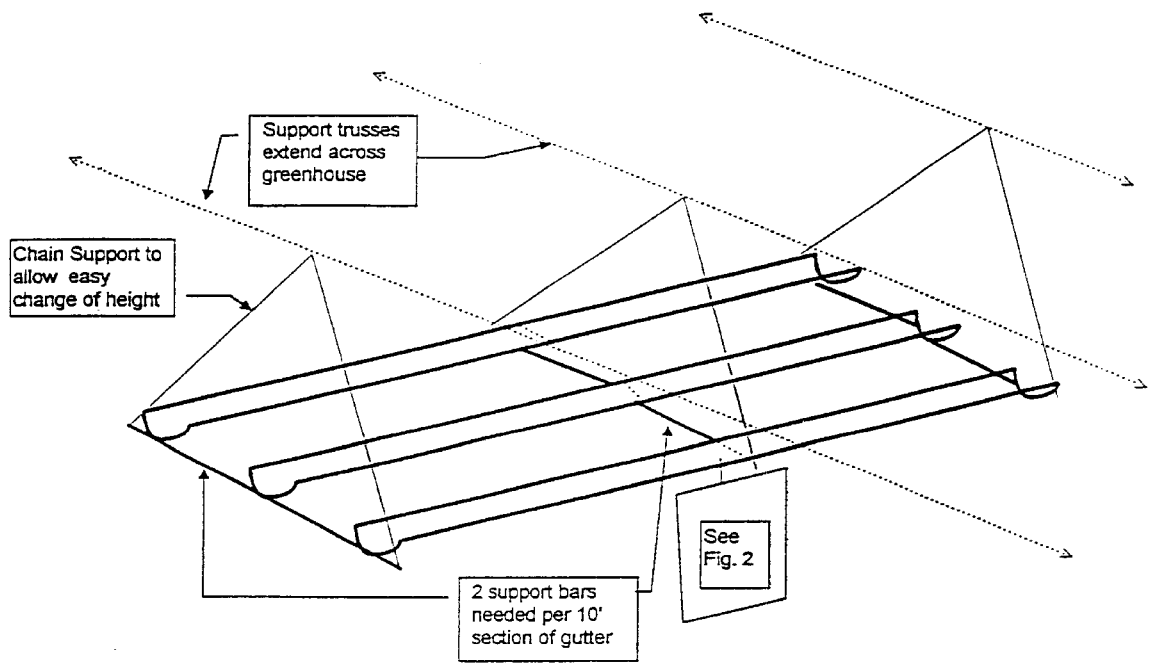
FIG. 1 shows the physical framework of elevated troughs used to produce daughter plant tips.
Figure 2:
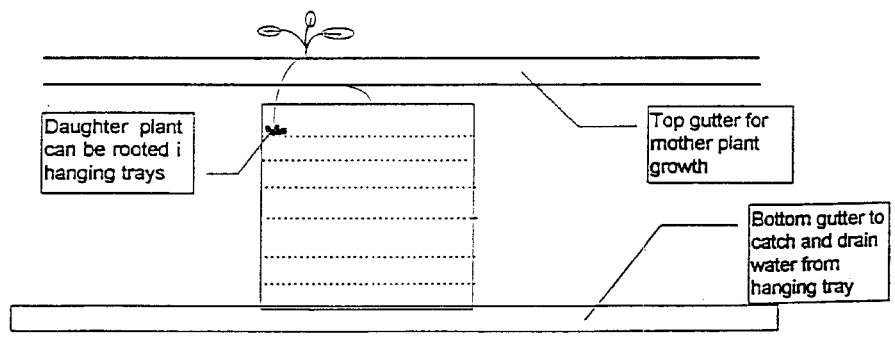
FIG. 2 shows a hanging tray for immediate plant tips rooting.

As shown in FIG. 2, a chain support 20 can be utilized to suspend the elevated gutters over the hanging trays, allowing easy change of height. The chain support 20 can suspend the elevated gutters from support trusses 22 extending across a greenhouse. Two support bars 24 are needed per 10 feet of gutter. As shown in FIG. 2, a top gutter 12a can be used for mother plant growth and a bottom gutter 12b can be used to catch and drain water from the hanging tray 18.

This technology is not only applicable to Florida strawberry production, but to all strawberry producing regions throughout the world.

Following are examples which illustrate procedures for practicing the invention. These examples should not be construed as limiting. All percentages are by weight and all solvent mixture proportions are by volume unless otherwise noted.

EXAMPLE 1

Strawberry Growing Systems and Treatments

'Sweet Charlie' and 'Oso Grande' micropropagated plantlets, first generation plantlets (daughter plants of micropropagated), and non-micropropagated plantlets were planted in a horizontal gutter system 14. The horizontal gutter system 14 was constructed in a glass greenhouse (35/25° C. day/night, 30% shade cloth). Photoperiod was extended to 16 hours with high pressure sodium halide lamps.

The horizontal system consisted of white plastic gutters 12 (10 cm width by 10 cm depth) that were elevated to 1.2 meters and filled with a soilless medium consisting of 4:1 (v/v) vermiculite:perlite mix (Verlite Company, Tampa, Fla.; Airlite Processing Corporation, Vero Beach, Fla.). Drip tubing, 30.5 cm emitter spacing with 62 ml/h/emitter at $55 \times 10^3$ Pa, was placed on the top of the rooting medium for fertigation in order to avoid leaf wetness. Plants were fertigated (Table 1) three times a day for ten minutes each fertigation. White on black plastic mulch (0.03 mm thickness) was used to cover the rooting medium in order to deter algae growth. Runners produced by the plants could hang over the gutter 12 and continue to grow down toward the ground.

A randomized complete-block experimental design was used with each treatment replicated five times. Treatments were planted (10 plants/plot) on alternating sides of the drip tube with a 10 cm plant spacing in the gutter 12 and 30 cm between center of gutters 12. Stolons were harvested at 6 and 16 weeks. Stolon, daughter plant, and crown number were recorded. Fifty daughter plants 16 from each replicated treatment were then propagated under mist irrigation (12 seconds of mist every 6 min.) for 1 week in 18.8 cm$^3$ container volume trays (Speedling Todd 100 flats) 18. The rooting medium consisted of a 4:1 vermiculite:perlite mix. Percentage of daughter plant tip survival was recorded after two weeks in the flats. Data were grouped by year, and subjected to analyses of variance (General Linear Models; Littell, R. C., R. J. Freund and P. C. Spector [1991] SAS System for Linear Models, Third Edition, SAS Institute Inc., Cary, N.C.). Treatment means were separated by Duncan's Multiple Range TGGT, 95% confidence level.

'Sweet Charlie' and 'Oso Grande' plant growth for all treatments was very vigorous in the gutter system 14. Micropropagated (MP=O) plants produced a greater number of branch crowns than plants not micropropagated (MP-No) or first generation from micropropagation (MP-1) plants (Table 2).

Daughter plant number and number of agolona per plant was greater in MP-0 plants than both the MP-1 plants and the MP-No plants. MP-1 plants produced more daughter plants and utolong than MP-No plants. In most comparisons, 'Oso Grande' MP-0 plants produced more daughter plants 16 and stolone than the MP-0 plants of the cultivar 'Sweet Charlie'.

Daughter plant survival after transplanting was very high. All treatments had survival rates of 96% or above. The gutter production system 14 used in this experiment had several advantages over traditional field propagation. The daughter plants produced were disease free, vigorous, had active root tips that established quickly, and the stolone could be harvested as long chains of daughter plants. The 10 cm×30 cm spacing resulted in approximately 30 mother plants per square meter. Therefore the micropropagated 'Oso Grande' treatment in 1996 yielded over 2500 plants per square meter in a 16 week time period. The large amount of daughter plants produced and the very high survival rate of the daughter plants after transplanting demonstrated that this gutter production system 14 is an excellent method for generation of vigorous, pathogen-free plants for plug production.

TABLE 1

Nutrient concentrations of fertigation solution

| Year 1 | | Year 2 | |
|---|---|---|---|
| Element[z] | mg/liter | Element[z] | mg/liter |
| N | 120 | N | 30 |
| P | 40 | P | 10 |
| K | 120 | K | 30 |
| Ca | 120 | Ca | 30 |
| Mg | 40 | Mg | 10 |
| S | 64 | S | 16 |
| B | 0.8 | B | 0.2 |
| Cu | 0.2 | Cu | 0.05 |
| Fe | 4.8 | Fe | 1.2 |
| Mn | 0.4 | Mn | 0.1 |
| Me | 0.04 | No | 0.01 |
| 2n | 0.4 | 2n | 0.1 |
| EC = 1,720 US | | EC = 700 US | |
| pH = 5.7 | | pH = 5.7 | |

[z]Nutrients derived from calcium nitrate, potassium nitrate, potassium phosphate, magnesium sulfate, boric acid, di-sodium copper, sodium EDTA ferric, di-sodium manganese, sodium EDTA molyhdate, sodium BTA zinc.

TABLE 2

Strawberry daughter plant production and growth

| Harvest Data (weeks) | Cultivar | Generation from Micro-propagation | Number crowns per plant | Number daughter plants per plant | Number stolons per plant | % survival of daughter plants |
|---|---|---|---|---|---|---|
| | | Year 1 | | | | |
| 8 | Oso Grande | 0 | 2.4 a[z] | 14.1 a | 6.6 a | 99.6 ab |
| | Oso Grande | 1 | 1.0 b | 9.4 b | 4.1 b | 99.2 ab |
| | Oso Grande | No | 1.1 b | 6.6 c | 3.1 c | 98.0 ab |
| | Sweet Charlie | 0 | 2.5 a | 9.4 b | 4.2 a | 100.0 a |
| | Sweet Charlie | 1 | 1.0 b | 6.6 c | 3.4 c | 99.6 ab |
| | Sweet Charlie | No | 1.0 b | 2.6 d | 1.7 d | 97.6 b |
| 16 | Oso Grande | 0 | 3.3 a | 35.9 a | 8.7 a | 98.8 ab |
| | Oso Grande | 1 | 1.0 d | 29.7 b | 6.5 b | 99.2 ab |
| | Oso Grande | No | 2.1 b | 26.8 c | 5.0 d | 97.2 b |
| | Sweet Charlie | 0 | 3.0 a | 30.4 b | 6.7 b | 99.6 a |
| | Sweet Charlie | 1 | 1.0 d | 27.2 c | 5.8 c | 100.0 a |
| | Sweet Charlie | No | 1.6 c | 25.7 c | 6.0 c | 98.8 ab |
| | | Year 2 | | | | |
| 8 | Oso Grande | 0 | 2.3 b | 15.3 a | 8.4 a | 100.0 a |
| | Oso Grande | 1 | 1.0 c | 12.8 b | 5.0 b | 99.6 ab |
| | Oso Grande | No | 1.0 c | 7.2 c | 3.5 c | 99.2 ab |
| | Sweet Charlie | 0 | 2.7 a | 16.7 a | 4.7 b | 99.6 ab |
| | Sweet Charlie | 1 | 1.0 c | 7.2 c | 3.6 c | 100.0 a |
| | Sweet Charlie | No | 1.0 c | 3.9 d | 2.1 d | 95.6 b |
| 16 | Oso Grande | 0 | 3.2 b | 68.7 a | 14.8 a | 99.6 NS |
| | Oso Grande | 1 | 1.0 a | 47.0 d | 12.8 b | 98.8 |
| | Oso Grande | No | 2.1 c | 37.2 f | 7.5 d | 98.4 |
| | Sweet Charlie | 0 | 3.8 a | 64.2 b | 14.6 a | 99.6 |
| | Sweet Charlie | 1 | 1.0 a | 57.6 c | 12.6 b | 99.2 |
| | Sweet Charlie | No | 1.5 d | 41.5 f | 10.3 c | 99.6 |

[z]Treatment means within the same year, harvest date, and column with the same letters are not significantly different at the 5% significance level according to Duncan's Multiple Range Test.

EXAMPLE 2

Biconvex, Elliptical and Rectangular Transplant Container Shapes

A further aspect of the subject invention provides a containerized transplant system to produce large uniform transplants. Increased strawberry plant size results in increased fruit production. Increasing transplant container volume by increasing perimeter, rather than depth, has resulted in increased strawberry plant size, but also can increase transplant production costs due to increased space requirements. Additionally, increasing the size of the bottom opening has been observed to increase root development. However, increasing the bottom size of a traditional container that is circular or square can result in the media falling out. In accordance with the subject invention it has been found that altering the shape of the container to be elliptical, biconvex, or rectangular allows large bottom openings without media falling out. Biconvex and elliptical containers require 25 and 15% less surface area respectively than circular containers. The larger bottom openings results in greater root development. This leads to quicker more uniform establishment of transplants. Therefore a biconvex or elliptical shaped container can be used to increase plant density during transplant propagation, decreasing surface area needed and reducing production costs.

EXAMPLE 3

Wet Mat Transplant Production System

When strawberry transplant roots are allowed to grow into a wet mat (thin material like carpet padding) the plants increase dramatically in size. Increased strawberry plant size results in increased fruit production.

It should be understood that the examples and embodiments described herein are for illustrative purposes only and that various modifications or changes in light thereof will be suggested to persons skilled in the art and are to be included within the spirit and purview of this application.

What is claimed is:

1. A method for growing strawberry plants, said method comprising growing strawberry plants for an extended photoperiod of about 16 hours in a system comprising:

elevated gutters in which mother plants are grown, wherein the elevated gutters comprise open troughs which are about 10 centimeters wide and about 10 centimeters deep, wherein the gutters are separated from one another by about 30 centimeters or less at their centers;

rooting medium comprising a vermiculite rperlite mix, which is placed in the elevated gutters;

drip tubing;

hanging trays in which to root daughter plants;

a high pressure sodium halide lamp for extending the photoperiod of the mother plants;

a green house having support trusses; and a means for suspending the elevated gutters over the hanging trays, wherein the elevated gutters are suspended from the support trusses, wherein daughter plant tips grow towards the hanging trays, and wherein the drip tubing delivers water and fertilizer to the mother and daughter plants.

2. A method for growing strawberry plants, said method comprising growing strawberry plants for an extended photoperiod of about 16 hours to induce runner formation in a system comprising:

elevated gutters in which mother plants are grown;

rooting medium that is soil-less which is placed in the elevated gutters;

drip tubing;

hanging trays in which to root daughter plants; and a means for extending the photoperiod of the mother plants grown in the elevated gutters, wherein daughter plant tips grow towards the hanging trays, and wherein the drip tubing delivers water and fertilizer to the mother and daughter plants.

3. A method for growing strawberry plants, said method comprising growing strawberry plants for an extended photoperiod of about 16 hours induce runner formation in a system comprising:

elevated gutters in which mother plants are grown;

rooting medium that is soil-less which is placed in the elevated gutters;

drip tubing; hanging trays in which to root daughter plants; and a high pressure sodium halide lamp for extending the photoperiod of the mother plants grown in the elevated gutters, wherein daughter tips grow towards the hanging trays, and wherein the drip tuding delivers water and fertilizer to the mother and daughter plants.

* * * * *

UNITED STATES PATENT AND TRADEMARK OFFICE
CERTIFICATE OF CORRECTION

PATENT NO. : 6,598,339 B1  Page 1 of 1
DATED : July 29, 2003
INVENTOR(S) : Eric B. Bish, Daniel Cantliffe and Craig Chandler It is certified that error appears in the above-identified patent and that said Letters Patent is hereby corrected as shown below:

Column 1,
Line 45, "of ftmctional leaves" should read -- of functional leaves --.

Column 5,
Line 23, "BTA zinc" should read -- ETA zinc --.

Column 7,
Line 7, "vermiculite rperlite" should read -- vermiculite:perlite --.

Column 8,
Line 12, "hours induce" should read -- hours to induce --.
Line 17, "drip tubing; hanging trays in which" should read -- drip tubing;
                                                          hanging trays in which --.
Line 21, "daughter tips grow" should read -- daughter plant tips grow --.
Line 22, "drip tuding" should read -- drip tubing --.

Signed and Sealed this

Eighteenth Day of November, 2003

JAMES E. ROGAN
*Director of the United States Patent and Trademark Office*